United States Patent [19]
Schweers et al.

[11] Patent Number: 6,094,346
[45] Date of Patent: Jul. 25, 2000

[54] PROCESSOR ASSEMBLY COOLING CELL

[75] Inventors: Michael R. Schweers, Hillsboro; Paul H. Anderson, Aloha, both of Oreg.

[73] Assignee: Intel Corporation, Santa Clara, Calif.

[21] Appl. No.: 09/221,831

[22] Filed: Dec. 29, 1998

[51] Int. Cl.[7] .................................................. H05K 7/20
[52] U.S. Cl. ........................ 361/695; 361/683; 361/687; 361/690; 361/692; 361/697; 361/700; 257/713; 257/723; 165/121; 165/104.33; 165/122; 454/184
[58] Field of Search ............................ 361/683, 685–687, 361/690–697, 735, 678, 717–719, 700–710; 165/80.3, 80.4, 122, 11.1, 104.32, 104.33, 104.34, 40, 121; 454/184; 62/259.2, 3.7; 257/707–722, 713, 721, 706–727

[56] References Cited

U.S. PATENT DOCUMENTS

| | | | |
|---|---|---|---|
| 5,107,398 | 4/1992 | Bailey | 361/384 |
| 5,297,005 | 3/1994 | Gourdine | 361/697 |
| 5,491,610 | 2/1996 | Mok et al. | 165/3 |
| 5,497,825 | 3/1996 | Yu | 165/11.1 |
| 5,546,272 | 8/1996 | Moss et al. | 361/687 |
| 5,559,673 | 9/1996 | Gagnon et al. | 361/695 |
| 5,563,768 | 10/1996 | Perdue | 361/695 |
| 5,745,041 | 4/1998 | Moss | 340/635 |
| 5,917,698 | 6/1999 | Viallet | 361/695 |

FOREIGN PATENT DOCUMENTS 409307034A 11/1997 Japan .............................. H01L 23/40

*Primary Examiner*—Leo P. Picard
*Assistant Examiner*—Michael Datskovsky
*Attorney, Agent, or Firm*—Kenyon & Kenyon

[57] ABSTRACT

A cooling apparatus for cooling a processor assembly is disclosed. The cooling apparatus includes a housing that has an intake port and an exhaust port. The intake port and exhaust port are communicable with ambient air outside of a computer chassis.

9 Claims, 4 Drawing Sheets

PROCESSOR ASSEMBLY COOLING CELL

BACKGROUND OF THE INVENTION

The present invention relates to an apparatus and method for cooling a processor assembly within a computer. More specifically, the invention provides for cooling of the processor assembly by providing it with its own dedicated airflow.

There are drawbacks with known methods for cooling a processor assembly that is installed within a computer chassis. Generally, processor cooling is achieved by providing a flow of air over the processor, however, known methods utilize "chassis air", i.e., air internal to the computer chassis, to cool the processor. This "chassis air" is drawn into the computer chassis through mechanical means, e.g., fans or blowers, and then is forced over the processors and accompanying heat sinks to aid in the convective cooling process. This "chassis air", however, undergoes a temperature increase before it reaches the processors, i.e., it is warmer than the ambient air external to the chassis, because of the greater temperature gradients within the chassis due to the other operating components within the chassis. Thus, the "chassis air" may have lost a significant amount of its cooling potential before it is directed over the processor assembly.

Therefore, because of the drawbacks associated with cooling of the processor assembly within a computer, it would be desirable to provide for an improved apparatus and method for cooling the processor assembly.

SUMMARY OF THE INVENTION

In accordance with an embodiment of the present invention, a cooling apparatus for cooling a processor assembly is provided. The cooling apparatus includes a housing that has an intake port and an exhaust port. The intake port and exhaust port are communicable with ambient air outside of a computer chassis.

DETAILED DESCRIPTION

Figure 1:
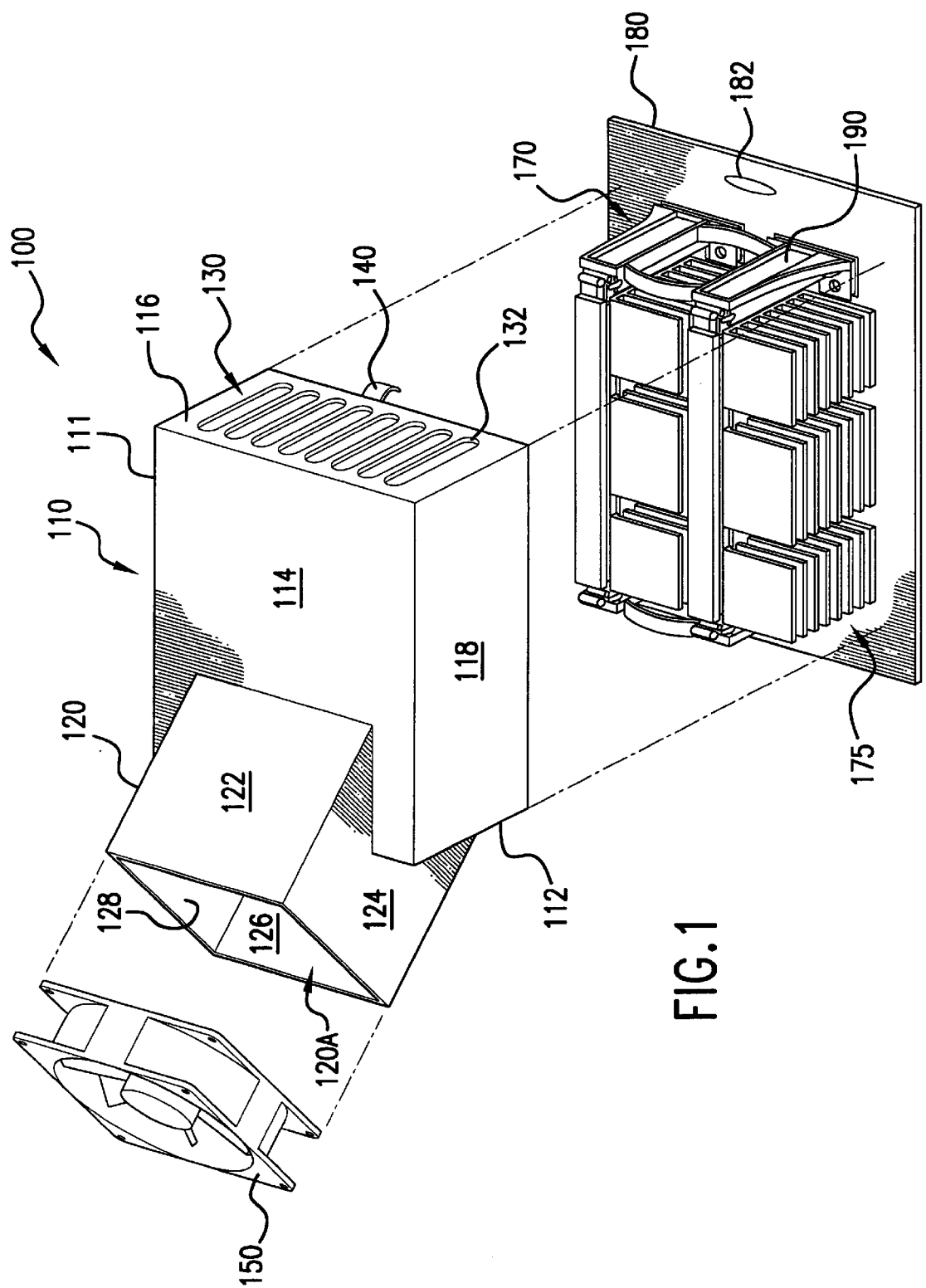
FIG. 1 is an exploded perspective view of a first embodiment of the cooling cell of the present invention.

FIG. 1 illustrates an embodiment of a cooling cell 100 that may be utilized to cool a processor assembly that is installed within a computer chassis. As is illustrated in FIG. 1, a cooling cell 100 is positioned over a processor assembly 170 to enclose and thermally insulate processor assembly 170 from other internal components within the computer chassis. Cooling cell 100 comprises a housing 110 that includes a processor enclosure 111, intake port 120, and exhaust port 130. Optionally, a fan 150 may be disposed within housing 110.

Processor enclosure 111 comprises a rectangular structure formed by a front wall 112, a top wall 114, a rear wall 116, and side walls 118. As such, processor enclosure 111 is a rectangularly-shaped structure that is mounted directly over processor assembly 170, which is installed on a printed circuit board 180, in order to thermally insulate the processor assembly from the other internal components of the computer.

Housing 110 includes an intake port 120 and an exhaust port 130. Intake port 120 also comprises a rectangularly-shaped structure that is defined by walls 122, 124, 126, and 128. The four walls define an intake opening 120A. Processor enclosure 111 includes an opening in it (not visible in FIG. 1) that is aligned with intake opening 120A. Intake port 120, as can be seen in FIG. 1, is oriented at an angle of approximately 45° with respect to processor enclosure 111 in this embodiment. This may be desirable so that as air is supplied from intake port 120 into processor enclosure 111, the air may be directed down upon processor assembly 170 so that efficient transfer of heat from the processor assembly may be achieved. However, the present invention is not limited to orienting intake port 120 with respect to processor enclosure 111 as illustrated in FIG. 1. For example, in an alternative embodiment, intake port 120 may be formed with processor enclosure 111 or may be a separate structural element that is attached to processor enclosure 111.

Cooling cell 100 also includes exhaust port 130. Whereas intake port 120 comprises a structure that is distinct from processor enclosure 111, exhaust port 130 is formed within rear wall 116 of processor enclosure 111. As such, a plurality of apertures 132 are provided in rear wall 116 to form exhaust port 130. However, exhaust port 130 is not required to be configured as such. Exhaust port 130 could also be a separate structural component, as is intake port 120, in alternative embodiments, for example.

An embodiment of cooling cell 100 may also include a fan. The fan may be any of a variety of fans and is not limited to any particular embodiment. An example of a fan that may be utilized with the present invention is a 92 millimeter fan. In the illustrated embodiment, a fan 150 is disposed within intake port 120 of housing 110. Fan 150 may be secured within intake port 120 by any of a variety of means and the present invention is not limited to any particular securement means. For example, fan 150 may be secured within intake port 120 by utilizing screws or may be snap-fitted into the intake port. Fan 150 provides for moving air through intake port 120 and into processor enclosure 111. The air supply provided by fan 150 flows over processor assembly 170 and is exhausted through exhaust port 130.

When cooling cell 100 is mounted over processor assembly 170, it thermally insulates processor assembly 170 from the other internal components in the computer chassis. Cooling cell 100 may be secured over the processor assembly 170 by any of a variety of means. One mechanism for securing cooling cell 100 over processor assembly 170 is to provide retention tabs 140 on the lower end of the walls that define the processor enclosure 111. FIG. 1 illustrates one of the retention tabs that may be utilized to secure cooling cell 100 over processor assembly 170. As illustrated, retention tab 140 is provided on rear wall 116. As the cooling cell 100 is placed over processor assembly 170, retention tab 140 would be positioned through aperture 182 that is included in printed circuit board 180 and the retention tab would retain the cooling cell on the printed circuit board, in this embodiment. The retention tab 140 could be provided with a camming surface that, as the camming surface is inserted through the aperture in the printed circuit board, would outwardly flex the retention tab such that it is able to penetrate through the aperture. Upon penetrating the aperture, the retention tab would flex back to its original orientation such that a grasping portion of the retention tab could secure against the underside of the printed circuit board. Retention tabs may be provided on the other walls that define processor enclosure 111 such that the processor enclosure may be securely mounted on the printed circuit board.

Alternatively, cooling cell 100 may be secured to the mounting structure 190 that is utilized to support the circuit cards 175 on the printed circuit board 180. Again, any of a variety of different types of securing devices may be provided on cooling cell 100 to secure the cooling cell to the mounting structure 190 if this structure was utilized as the attachment point for the cooling cell.

Figure 2:
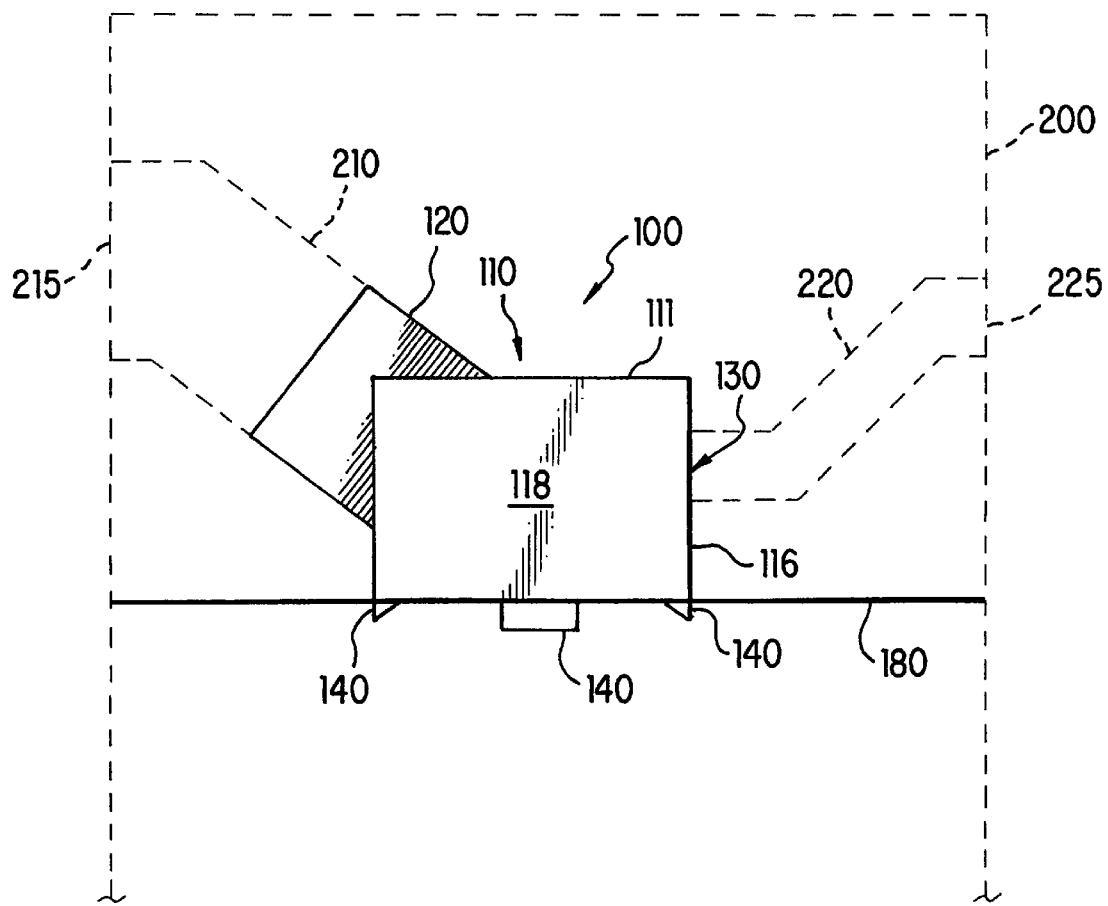
FIG. 2 is a side view of the cooling cell of FIG. 1.

FIG. 2 illustrates a schematic of cooling cell 100 as it might be utilized to thermally insulate and cool a processor assembly (not visible) within a computer chassis 200. In FIG. 2, computer chassis 200 is shown in phantom. As illustrated, cooling cell 100 has been positioned over processor assembly 170 and is secured to the printed circuit board 180 by utilizing retention tabs 140 as previously discussed. An intake duct 210 and an exhaust duct 220, which are shown in phantom in FIG. 2, are utilized in conjunction with cooling cell 100 in this embodiment. Intake duct 210 provides an enclosed path for supply air that is drawn from outside of computer chassis 200 through intake opening 215 in the computer chassis and provided to processor assembly 170 through intake port 120. As such, fan 150 (not visible in FIG. 2) is able to supply air to the processor assembly by taking air from outside of the computer chassis 200 and directing air to the processor assembly through intake duct 210. After the air is directed over the processor assembly, the air is exhausted through the exhaust port 130 that is in the rear wall 116 of cooling cell 100. The exhaust air is exhausted from chassis 200 by utilizing exhaust duct 220 and exhaust opening 225. In this manner, the processor assembly is thermally insulated from the other internal components in the chassis and its own dedicated air flow is provided through the chassis to cool the processor assembly.

In the illustrated embodiment fan 150 is provided in intake port 120 to draw air from outside of the computer chassis and provide air over the processor assembly to cool the processor assembly. However, fan 150 could also be provided in an exhaust port, if an exhaust port was included as a separate structural element, as discussed previously. In this alternative configuration, the fan would draw air out of the cooling cell and exhaust air outside of the computer chassis, which in-turn would still create an air flow over the processor assembly by utilizing air that is drawn from outside of the chassis through the intake duct and over the processor assembly. In this alternative configuration, the fan is not directly providing air over the processor assembly, but rather, is drawing air over the processor assembly. With either configuration, a dedicated air flow is still provided over the processor assembly through the chassis.

Figure 3:
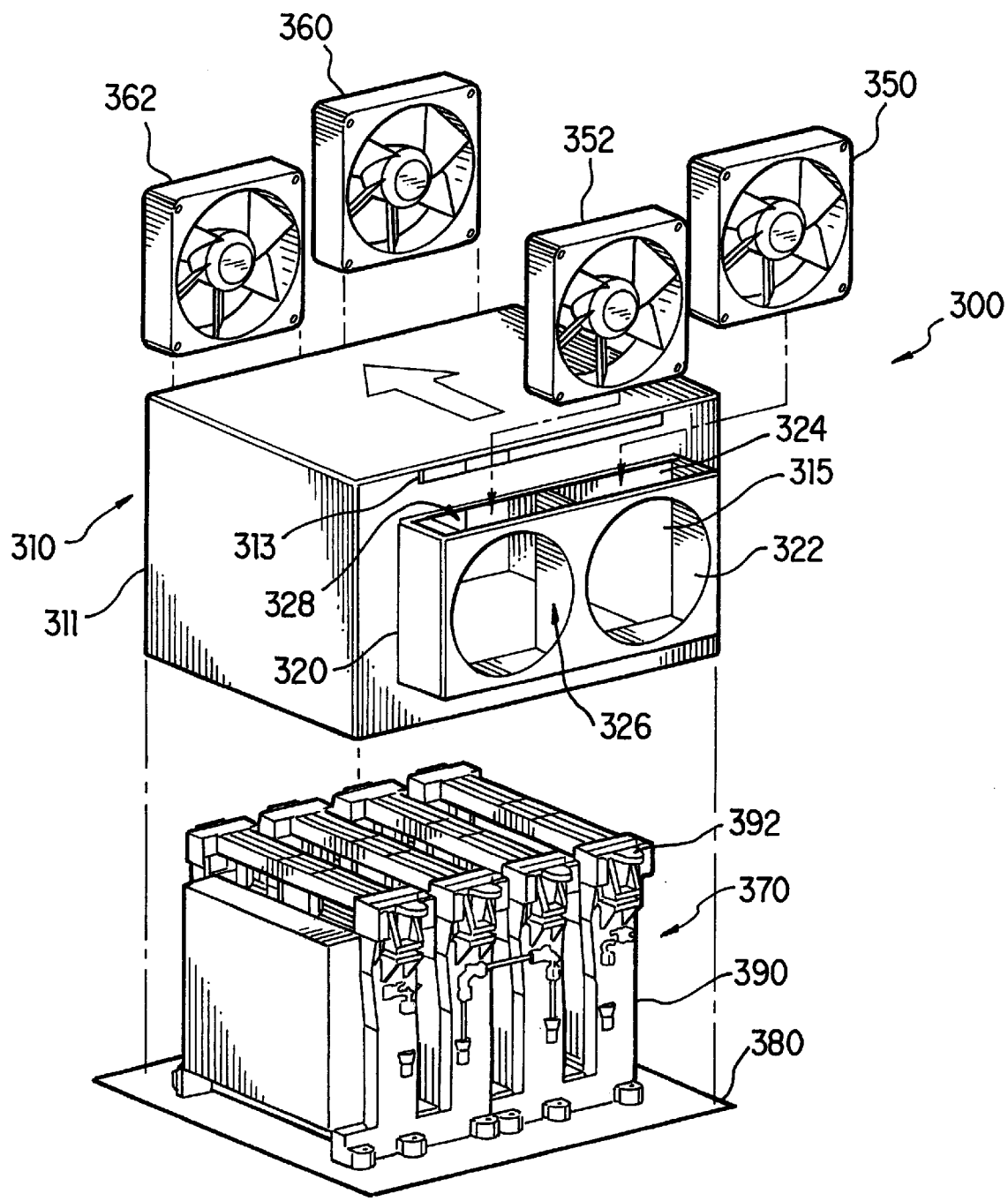
FIG. 3 is an exploded perspective view of a second embodiment of the cooling cell of the present invention.
Figure 4:
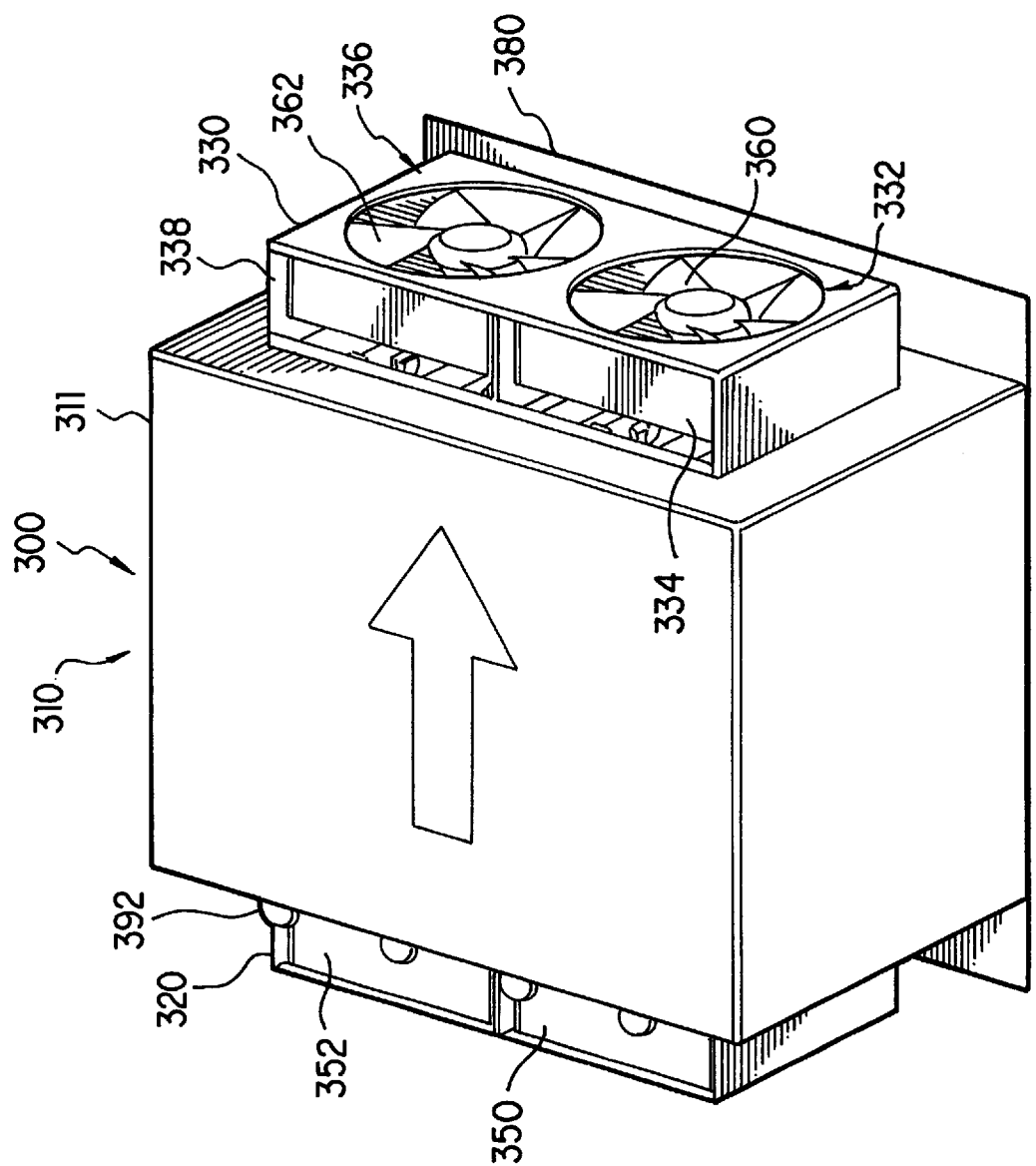
FIG. 4 is an assembled perspective view of the cooling cell of FIG. 3.

FIGS. 3 and 4 illustrate a second embodiment for the cooling cell of the present invention. The cooling cell 300, as embodied in FIGS. 3 and 4, would function similarly to the cooling cell as embodied in FIGS. 1 and 2 and as described above. The differences between the embodiments of FIGS. 1–2 and FIGS. 3–4 relate to the physical configurations for the cooling cells. Thus, cooling cell 300 could be disposed over a processor assembly and could be attached to either the printed circuit board or to mounting structure that supports the processor assembly. Additionally, ducting could be provided within the computer chassis to extend from the walls of the chassis to the cooling cell. Thus, the ducting could provide for supplying air to, and exhausting air from, the cooling cell through the chassis.

As can be seen in FIGS. 3 and 4, cooling cell 300 comprises a housing 310 that includes a processor enclosure 311, an intake port 320 and an exhaust port 330. As in the embodiment of FIGS. 1 and 2, processor enclosure 311 is a rectangularly-shaped structure. Housing 310 is disposed over processor assembly 370 and may be mounted to either printed circuit board 380 or to mounting structure 390, which supports the circuit cards of the processor assembly.

Intake port 320 is disposed on a first side of processor enclosure 311 and exhaust port 330 is disposed on a second side of processor enclosure 311. Since, in this embodiment for cooling cell 300, intake port 320 and exhaust port 330 are similarly formed, a detailed description will only be provided for intake port 320. As can be seen, intake port 320 is a rectangularly-shaped structure that is disposed on an outside wall of processor enclosure 311. Intake port 320 defines a first intake opening 322 and a second intake opening 326. First intake opening 322 and second intake opening 326 provide for access into housing 310 such that ambient air from outside of the computer chassis may be drawn through the computer chassis and into cooling cell 300. Intake port 320 also defines a first fan access slot 324 and a second fan access slot 328. The first and second fan access slots 324, 328, respectively, are located on the top side of intake port 320.

Received within intake port 320 through the first and second fan access slots 324, 328 are first intake fan 350 and second intake fan 352, respectively. As such, first and second intake fans 350, 352 are retained within intake port 320 and supply air to cooling cell 300. Intake fans 350 and 352 may be either rigidly secured within intake port 320, such as by utilizing screws, or may be removably positioned within intake port 320 such that the fans may be removed by an operator without requiring removal hardware in the event that a fan(s) needs to be replaced for maintenance or repair purposes. It should be noted that an opening 315 exists in the wall of processor enclosure 311 that is aligned with first and second intake openings 322 and 326 of intake port 320. As such, air can be provided from outside of cooling cell 300 to cooling cell 300.

As can also be seen in FIG. 3, processor enclosure 311 also includes processor assembly mounting structure slot 313 that is disposed above the location where intake port 320 is located. As such, processor assembly mounting structure slot 313 may receive within it mounting structure tabs 392 that are associated with mounting structure 390.

As was mentioned previously, and as can be seen in FIG. 4, exhaust port 330 is formed similar to intake port 320. As such, exhaust port 330 includes first exhaust opening 332 and second exhaust opening 336. First exhaust fan 360 is received through first exhaust fan access slot 334 and second exhaust fan 362 is received through second exhaust fan access slot 338 such that first exhaust fan 360 and second exhaust fan 362 may be positioned within exhaust port 330. Again, an opening is provided in the wall of processor enclosure 311 that aligns with first and second exhaust openings 332, 336 such that an unobstructed path exists for a flow of air from within cooling cell 300 to a location external to the computer chassis.

Whereas the embodiment of FIGS. 3 and 4 included two intake fans and two exhaust fans, it is not required that two intake fans and two exhaust fans be utilized. For example, a single intake fan and a single exhaust fan could be utilized to provide a flow of air through cooling cell 300. Additionally, as was discussed for the embodiment of the cooling cell of FIGS. 1 and 2, both an intake fan and an exhaust fan is not required. A single intake fan can be utilized to direct air over the processor assembly or a single exhaust fan can be utilized to draw air from the cooling cell 300. Thus, any combination of intake and/or exhaust fans can be utilized with the cooling cell of the embodiment of FIGS. 3 and 4.

Housings 110 and 310 may be manufactured from any of a variety of materials. For example, they can be manufactured from plastic and be formed as a single unit by utilizing an injection molding process. If the housing is manufactured from a plastic material, the plastic will be adequate to thermally insulate the processor assembly from the other internal components without additional insulating materials. However, should a material be utilized to form the housing that is not able to sufficiently thermally insulate the processor assembly, but is advantageous to use for other reasons, e.g., structural strength, additional insulating materials can be utilized in combination with the material utilized to form the housing in order to provide the desired thermal insulating characteristics.

Several variations on the disclosed embodiments are contemplated. The cooling cell of the present invention may be utilized separately from ducting installed within a chassis in some embodiments. The intake port and exhaust port of the cooling cell could be configured such that they would be able to extend through the chassis such that they would be in communication with the ambient air outside of the chassis.

Additionally, it is not required that cooling fans be installed within the housings of the cooling cell. All that is required is that a dedicated air supply be provided to the processor assembly through the cooling cell. As such, a fan, or fans, can be provided within the housing of the cooling cell or a fan can be provided external to the cooling cell such that it directs air into the cooling cell and/or exhausts air from the cooling cell. It may not even be required that a fan be specifically provided for the cooling cell.

A cooling cell in accordance with the present invention may be utilized to cool any of a variety of different types of processor assemblies. For example, the cooling cell embodiment of FIGS. 1 and 2 is illustrated as being utilized to cool dual Slot 1 Pentium® II processors and the embodiment of FIGS. 3 and 4 is illustrated as being utilized to cool four Slot 2 Pentium® II processors, all available from Intel®. However, the present invention is not limited to cooling any particular type of processor assembly.

The disclosed embodiments are illustrative of the various ways in which the present invention may be practiced. Other embodiments can be implemented by those skilled in the art without departing from the spirit and scope of the present invention.

What is claimed is:

1. A processor cooling apparatus comprising:

a housing, said housing including a processor enclosure, an intake port and an exhaust port, said intake port and said exhaust port communicable with ambient air outside of a computer chassis, wherein a side of said intake port defines a first intake opening and a second intake opening and wherein a side of said exhaust port defines a first exhaust opening and a second exhaust opening;

a first intake fan;

a second intake fan;

a first exhaust fan; and a second exhaust fan;

wherein said first and second intake fans are disposed within said intake port and wherein said first intake fan and said second intake fan are axially aligned with said first intake opening and said second intake opening, respectively;

wherein said first and second exhaust fans are disposed within said exhaust port and wherein said first exhaust fan and said second exhaust fan are axially aligned with said first exhaust opening and said second exhaust opening, respectively;

and wherein a top of said intake port and a top of said exhaust port are oriented perpendicular to said sides of said intake port and said exhaust port and wherein said first and second intake fans and said first and second exhaust fans are removably positionable within said intake port and said exhaust port, respectively, through a fan access slot defined by said tops of said intake port and said exhaust port.

2. The processor cooling apparatus of claim 1 wherein said intake port is disposed on a first side of said processor enclosure and said exhaust port is disposed on a second side of said processor enclosure.

3. The processor cooling apparatus of claim 1 wherein said housing is mounted to a printed circuit board.

4. The processor cooling apparatus of claim 1 wherein said housing is mounted to a processor card retention module.

5. The processor cooling apparatus of claim 1 further comprising an intake duct extending from said intake port and an exhaust duct extending from said exhaust port.

6. The processor cooling apparatus of claim 1 wherein said intake port and said exhaust port are rectangularly-shaped structures.

7. The processor cooling apparatus of claim 1 wherein said intake port and said exhaust port are disposed on an outside wall of said processor enclosure.

8. The processor cooling apparatus of claim 1 wherein said processor enclosure defines a slot, said slot adapted to receive within it a mounting structure tab of a processor card mounting structure.

9. The processor cooling apparatus of claim 8 wherein said slot is located on said processor enclosure above a location where said intake port is located on said processor enclosure.

* * * * *